US005490688A

United States Patent [19]
Cheng

[11] Patent Number: 5,490,688
[45] Date of Patent: Feb. 13, 1996

[54] CONTROL DEVICE FOR FOLDING AND EXPANDING A BAGGAGE CART

[76] Inventor: Chin-Chang Cheng, No. 20, Lane 327, Sec. 2, Chung Shan Rd., Chung Ho City, Taipei Hsien, Taiwan

[21] Appl. No.: 328,888

[22] Filed: Oct. 25, 1994

[51] Int. Cl.⁶ .................................................... B62B 1/04
[52] U.S. Cl. ...................... 280/655; 280/47.29; 403/102
[58] Field of Search .............................. 403/84, 99, 102; 280/.651, 652, 654, 655, 47.24, 47.26, 47.29, 47.17, 645

[56]  References Cited

U.S. PATENT DOCUMENTS

| 2,744,794 | 5/1956 | Sheard | 403/102 X |
|---|---|---|---|
| 4,270,239 | 6/1981 | Gross | 280/655 X |
| 4,401,319 | 8/1983 | Kazmark | 280/655 |
| 4,637,626 | 1/1987 | Foss et al. | 280/655 |
| 5,431,428 | 7/1995 | Marchwiak et al. | 280/655 |

Primary Examiner—Karin L. Tyson
Assistant Examiner—Michael Mar
Attorney, Agent, or Firm—William E. Pelton

[57]  ABSTRACT

A control device is provided for folding and extending a baggage cart which includes a substantially U-shaped support member having a horizontal first bight and two parallel vertical legs, a substantially U-shaped handle portion having a horizontal second bight and two parallel elongated stands each respectively pivotally engaged with a corresponding one of the vertical legs, a base member pivotally engaged with the support member, the control device including a movable sleeve member which is movably mounted on the pair of elongated stands and has a top plate, a pair of lug portions each laterally formed on the movable sleeve member and each having a vertical passage longitudinally defined therein for receiving a corresponding one of the elongated stands, the sleeve member having an opening facing downwardly for receiving the pair of vertical legs therein with the first bight of the support member abutting against the top plate of the sleeve member.

7 Claims, 6 Drawing Sheets 5,490,688

CONTROL DEVICE FOR FOLDING AND EXPANDING A BAGGAGE CART

FIELD OF INVENTION

The present invention relates to a control device, and more particularly to a control device for folding and extending a baggage cart for carrying baggage or the like.

RELATED PRIOR ART

A conventional control device for folding and extending a baggage cart is shown in FIG. 8. However, by such an arrangement, there are still a few shortcomings in the conventional control device. There will be a more complete and sufficient illustration in the detailed description of the preferred embodiments, concerning the conventional control device.

The present invention has arisen to mitigate and/or obviate the above-mentioned disadvantages of the conventional control device.

SUMMARY OF THE INVENTION

The primary objective of the present invention is to provide a control device for folding and extending a baggage cart which is available for carrying baggage and the like.

In accordance with one aspect of the present invention, there is provided a control device for folding and extending a baggage cart which comprises a substantially U-shaped support member including a horizontal first bight and two parallel vertical legs, a substantially U-shaped handle portion having a horizontal second bight and two parallel elongated stands each respectively pivotally engaged with a corresponding one of the vertical legs, a base member pivotally engaged with the support member at a lower portion of each of the vertical legs, the control device comprising a movable sleeve member which is movably mounted on the pair of elongated stands and has a top plate, a pair of lug portions each laterally formed on the movable sleeve member and each having a vertical passage longitudinally defined therein for receiving a corresponding one of the elongated stands such that the sleeve member is able to move along the elongated stands, the sleeve member having an opening facing downwardly, whereby, the sleeve member is able to be moved downwardly along the pair of elongated stands to a first position where an upper portion of each of the pair of vertical legs is received in the opening of the sleeve member with the first bight of the support member abutting against the top plate of the sleeve member such that each of the elongated stands is respectively fixed to a corresponding one of the vertical legs, thereby fixing the handle portion to the support member, and the sleeve member is able to be moved upwardly along the pair of elongated stands to a second position where the first bight and the vertical legs of the support member are detached from the opening of the sleeve member such that the elongated stands are able to pivot relative to the vertical legs, thereby folding the handle portion.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 8:
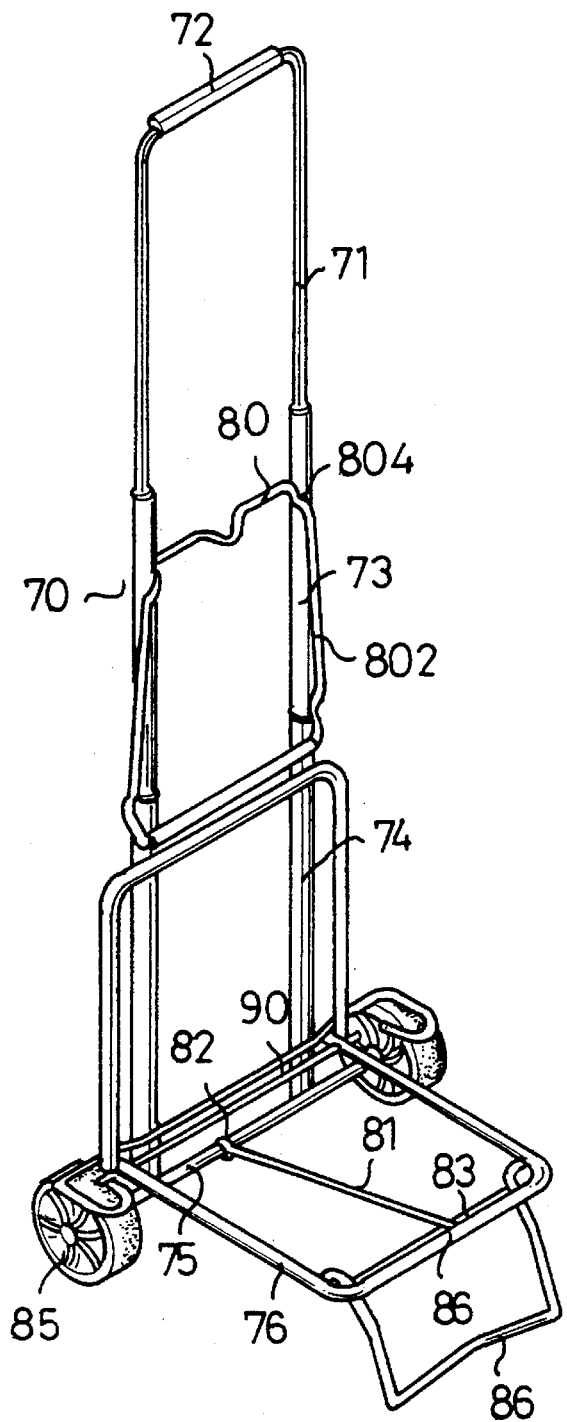
FIG. 8 is a perspective view of a conventional control device in accordance with the prior art.

Referring to FIG. 8, a conventional control device in accordance with the prior art is provided for folding and extending a baggage cart which comprises a retractable telescopic assembly 70 including a pair of lower tubes 74, a pair of mediate tubes 73 each telescopically received in a corresponding one of said lower tubes 74, a substantially U-shaped handle portion (not labeled) having a pair of upper tubes 71 telescopically received in a corresponding one of said mediate tubes 73 and having a bight (not labeled) integrally formed between said upper tubes 71, a padded sleeve 72 securely mounted around said bight for convenient holding by a user, a wheel shaft 75 securely attached to a lower end of each of the lower tubes 74, a pair of wheels 85 each rotatably mounted around a corresponding distal end of the wheel shaft 75, a pivot axle 90 fixedly mounted on the lower end of each of the lower tubes 74, a substantially U-shaped support frame 76 pivotally engaged with the pivot axle 90, a substantially U-shaped retaining member 84 pivotally engaged with a bight portion (not labeled) of the support frame 76, a horizontal linking rod 83 attached between two distal ends of the retaining member 84. The control device comprises a retaining frame 80 pivotally mounted on the upper portion of the lower tubes 74, an arcuate resilient portion 804 is formed on an upper section of each of two vertical rods 802 of the retaining frame 80, whereby, when the retractable assembly 70 is in a fully extended status, that is, the upper tubes 71 are fully extended outward of the mediate tubes 73 which are sequentially extended outward of the lower tubes 74, the retaining frame 80 is pivoted to urge against the mediate tubes 73 with the arcuate portion 804 thereof being wedged between the two mediate tubes 73 which are thus forced to offset outwardly relative each other such that the upper tubes 71 are not able to retract into the mediate tubes 73, thereby locking and positioning the upper tubes 71. The control device further comprises an elongated bar 81 having a ring portion 82 pivotally mounted around the wheel shaft 75 and a snapping end 86 releasably engaged on the linking rod 83, whereby, when the snapping end 86 is engaged on the linking rod 83, the pivotal movement of the support frame 76 is limited, thereby fixing the support frame 76, and when the snapping end 86 is detached from the linking rod 83, the support frame 76 is able to pivot relative to the lower tubes 74 about the pivot axle 90, thereby folding the support frame 76. By such an arrangement, the retaining frame 80 is easily detached from the mediate tubes 73, so causing a failure in safety in positioning the upper tubes 71. In addition, the bar 81 is not easy to secure the support frame 76 due to loose engagement between the snapping end 86 and the linking rod 83.

Figure 1:
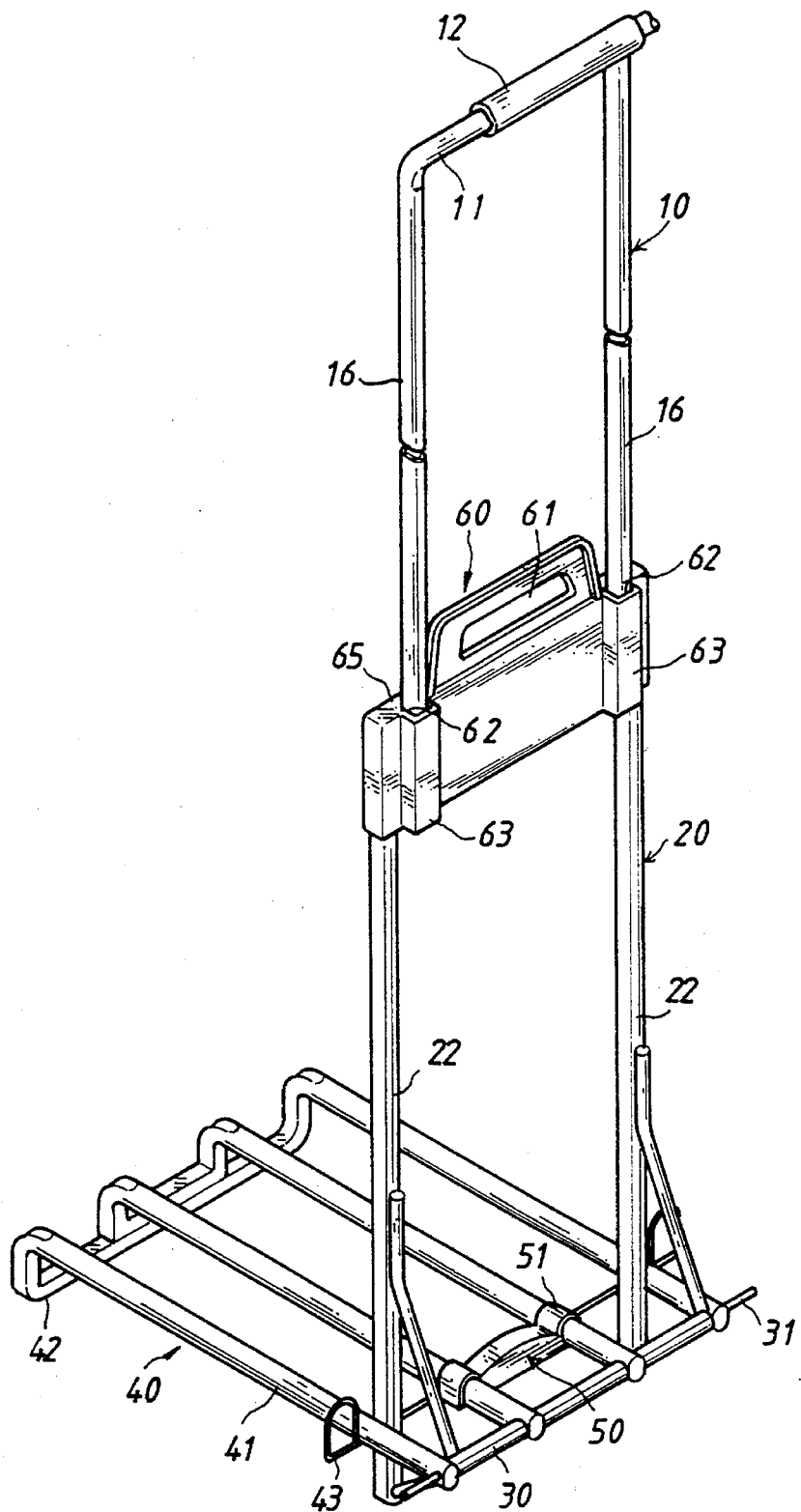
FIG. 1 is a perspective view of a control device for folding and extending a baggage cart in accordance with the present invention.
Figure 2:
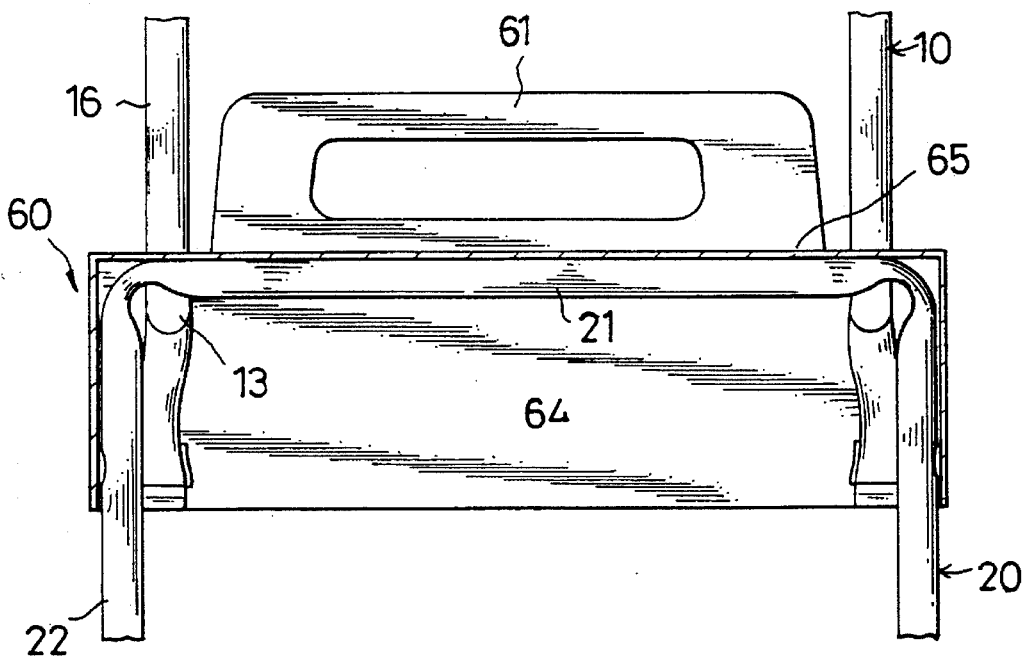
FIG. 2 is a partially rear plan cross-sectional view showing a movable sleeve member.

Referring to FIGS. 1–7, and initially to FIGS. 1 and 2, a control device in accordance with the present invention is provided for folding and extending a baggage cart which comprises a substantially U-shaped support member 20 including a horizontal first bight 21 (see FIG. 2) and two parallel vertical legs 22 each extending downwardly therefrom, a substantially U-shaped handle portion 10 having a horizontal second bight 11 and two parallel elongated stands 16 each extending downwardly therefrom and each respectively pivotally engaged with a corresponding one of the vertical legs 22 of the support member 20, and a padded sleeve 12 securely mounted around the second bight 11 of the handle portion 10 for conveniently holding and grasping by a user, a base member 40 pivotally engaged with the support member 20 at a lower portion of each of the vertical legs 22. The control device comprises a movable sleeve member 60 movably mounted on the pair of elongated stands 16 of the handle portion 10 and includes a top plate 65 (see FIG. 2) and a handgrip 61 formed on an upperside of the top plate 65, a pair of lug portions 63 each laterally formed on the movable sleeve member 60 and each having a vertical passage 62 longitudinally defined therein for receiving a corresponding one of the elongated stands 16 of the handle portion 10 such that the sleeve member 60 is able to slide upwardly and downwardly along the elongated stands 16 of the handle portion 10 (see FIG. 3), the sleeve member 60 having a recessed portion with an opening 64 (see FIG. 2) facing downwardly for receiving the first bight 21 and the vertical legs 22 therein.

Figure 3:
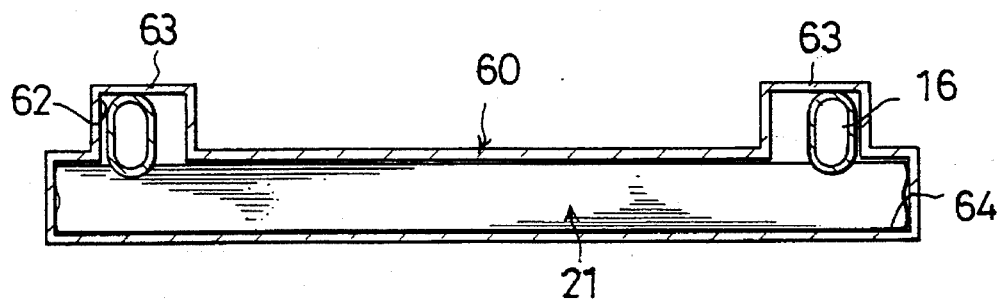
FIG. 3 is a top plan cross-sectional view of FIG. 2.
Figure 4:
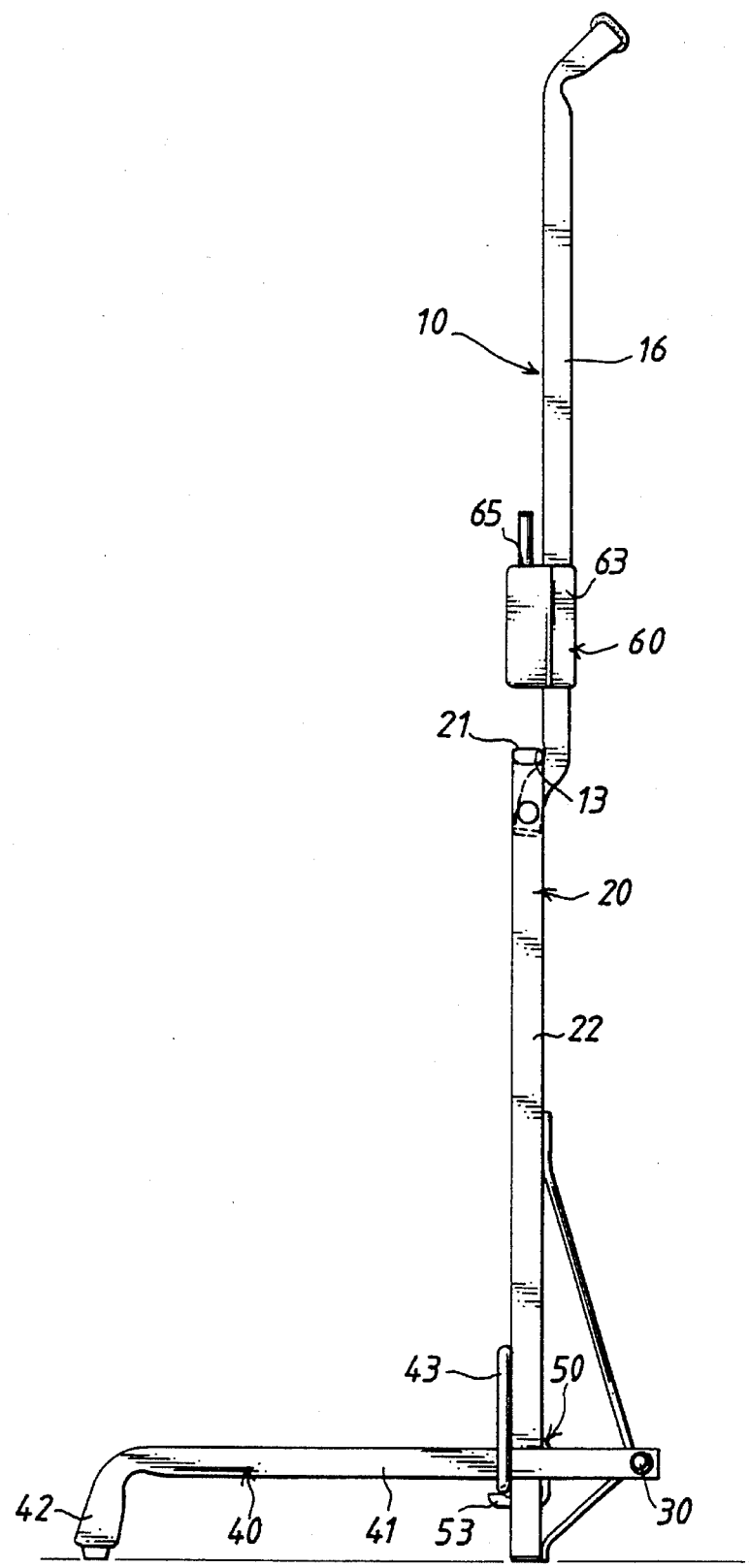
FIG. 4 is a left side plan view showing a stand of a handle portion being in alignment with a vertical leg of a support member.
Figure 5:
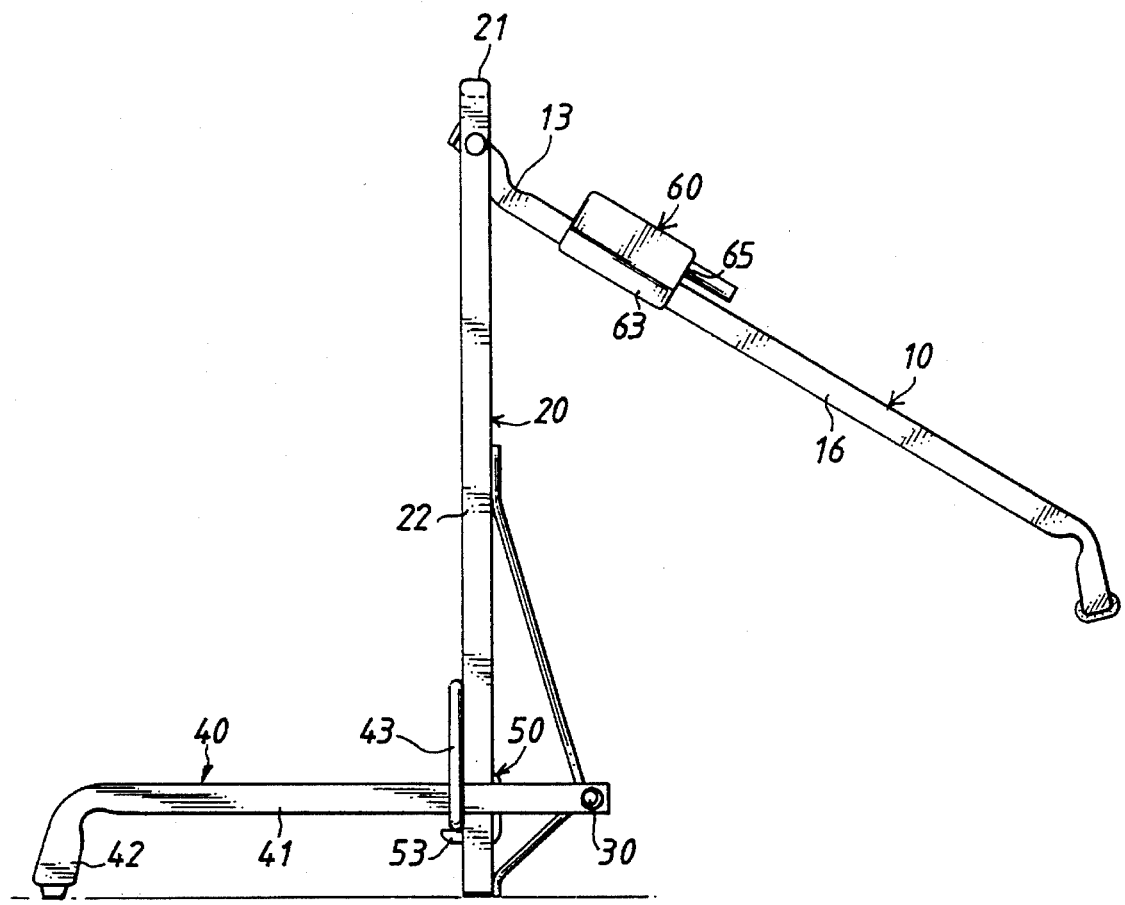
FIG. 5 is an operational view showing the handle portion being pivoted relative to the support member.

In operation, referring to FIGS. 2 and 3 with reference to FIGS. 4 and 5, when in use, the handgrip 61 is initially moved downwardly by the user such that the sleeve member 60 is forced to slide downwardly along the pair of elongated stands 16 of the handle portion 10 to a first position where an upper portion of each of the pair of vertical legs 22 of the support member 20 is received in the opening 64 of the sleeve member 60 with the first bight 21 of the support member 20 abutting against the top plate 65 of the sleeve member 60 such that each of the elongated stands 16 of the handle portion 10 is respectively fixed to a corresponding one of the vertical legs 22 of the support member 20, thereby fixing the handle portion 10 to the support member 20 (see FIG. 2). When not in use, the handgrip 61 may be lifted upwardly such that the sleeve member 60 is moved upwardly along the pair of elongated stands 16 to a second position where the first bight 21 and the vertical legs 22 of the support member 20 are detached from the opening 64 of the sleeve member 60 (see FIG. 4) such that the elongated stands 16 of the handle portion 10 are able to pivot relative to the vertical legs 22 of the support member 20, thereby folding the handle portion 10 (see FIG. 5).

Preferably, each of the elongated stands 16 of the handle portion 10 has a lower end pivotally engaged with an upper end of a corresponding one of the vertical legs 22 of the support member 20, a recess 13 is defined in the lower end of each of the elongated stands 16 for receiving the first bight 21 of the support member 20 therein such that the elongated stands 16 are able to align with the vertical legs 22 (see FIG. 4) and such that the movable sleeve member 60 is able to receive the first bight 21 and the vertical legs 22 in the opening 64 thereof, thereby fixing the elongated stands 16 of the handle portion 10 to the vertical legs 22 of the support member 20 as shown in FIG. 2.

Again referring to FIG. 1 with reference to FIG. 4, a pivot axle 30 is fixed to the support member 20 beside the lower end of each of the vertical legs 22 thereof, a pair of wheel shafts 31 each extend outwardly from a free end of the pivot axle 30, a pair of wheels (not shown) each are rotatably mounted around a corresponding one of the wheel shafts 31. The base member 40 comprises four parallel elongated rods 41 each having a distal end perpendicularly and pivotally engaged with the pivot axle 30, a bent support portion 42 is formed on a distal end of each of the elongated rods 41 for supporting the base member 40. The control device further comprises an elongated bar 43 fixedly attached to the lower end of each of the vertical legs 22 of the support member 20 and located beneath and abutting against the four elongated rods 41 in a perpendicular manner, a snapping member 50 movably mounted on the base member 40 between two adjacent middle elongated rods 41 and having a hook end 53 formed on an underside thereof for releasably engaged with the elongated bar 43. Preferably, the snapping member 50 comprises a pair of sleeves 51 each movably mounted around a corresponding one of the two adjacent middle elongated rods 41 such that the snapping member 50 is slidable on the base member 40.

Figure 7:
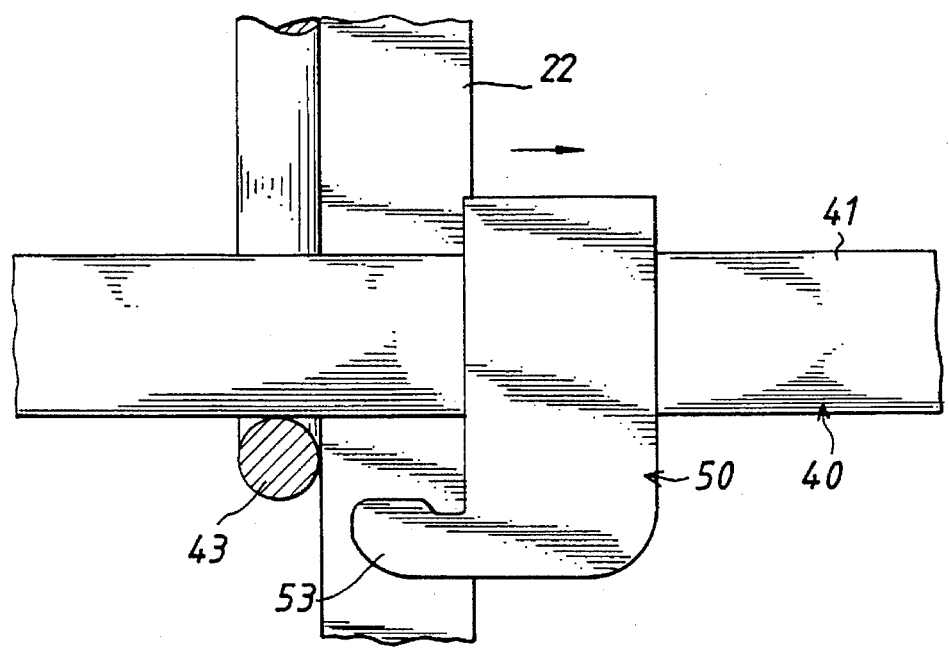
FIG. 7 is an operational view showing the hook end being detached from the bar.
Figure 6:
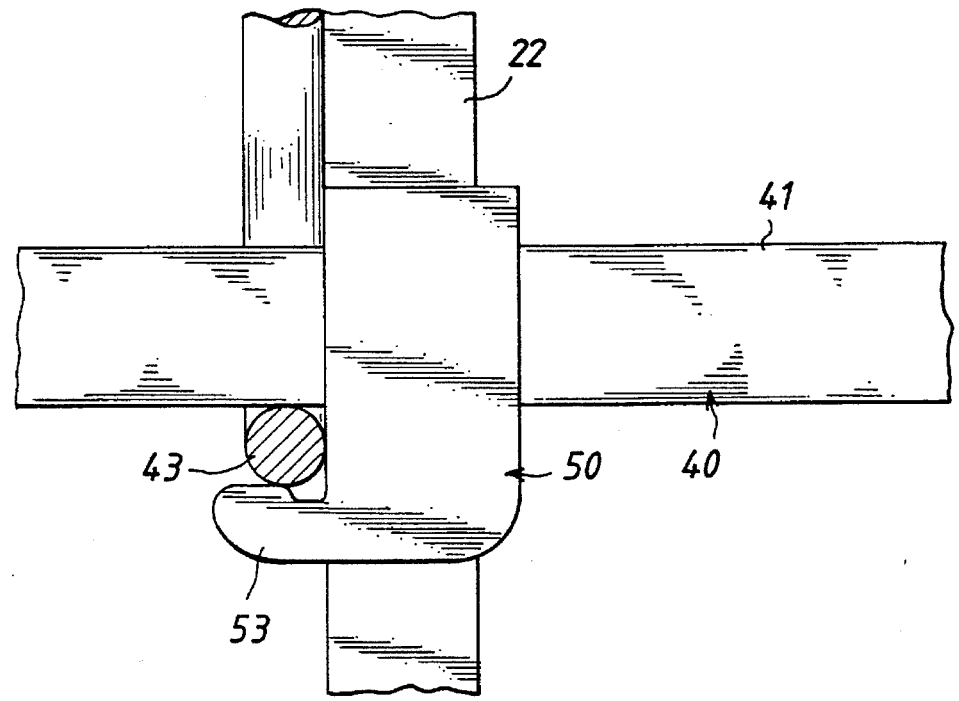
FIG. 6 is an operational view showing a hook end being engaged with a bar.

In operation, referring to FIGS. 6 and 7, when the hook end 53 of the snapping member 50 is engaged with the elongated bar 43, because the hook end 53 is snapped and fixed by the elongated bar 43, therefore, pivotal movement of the elongated rods 41 relative to the support member 20 about the pivot axle 30 is limited and stopped such that the base member 40 is fixed by the elongated bar 43 (see FIG. 6). When the hook end 53 of the snapping member 50 is moved along a direction of the arrow as shown in FIG. 7, thereby being detached from the elongated bar 43, the elongated rods 41 together with the snapping member 50 are able to pivot relative to the vertical legs 22 of the support member 20 about the pivot axle 30, thereby folding the base member 40.

Accordingly, a control device in accordance with the present invention has the following advantages and benefits:

(1) It is easy to fold and extend the handle portion just by moving the sleeve member upwardly to detach from or downwardly to receive the first bight and the vertical legs of the support member.

(2) It is easy to fold and expand the base member just by moving the hook end of the snapping member to detach from or engage with the elongated bar.

It should be clear to those skilled in the art that further embodiments of the present invention may be made without departing from the teachings of the present invention.

What is claimed is:

1. A control device for folding and extending a baggage cart which comprises a substantially U-shaped support member (20) including a horizontal first bight (21) and two parallel vertical legs (22) each extending downwardly therefrom, a substantially U-shaped handle portion (10) having a horizontal second bight (11) and two parallel elongated stands (16) each extending downwardly therefrom and each respectively pivotally engaged with a corresponding one of said vertical legs (22) of said support member (20), a base member (40) pivotally engaged with said support member (20) at a lower portion of each of said vertical legs (22), said control device comprising:

a movable sleeve member (60) movably mounted on said pair of elongated stands (16) of said handle portion (10) and comprising a recessed portion formed by a top plate (65) and side walls, a pair of lug portions (63) each laterally formed on said movable sleeve member (60) and offset from said recessed portion, each having an opening formed in said top plate, and each having a vertical passage (62) longitudinally defined therein for receiving a corresponding one of said elongated stands (16) of said handle portion (10) such that said sleeve member (60) is able to move along said elongated stands (16) of said handle portion (10), said recessed portions and vertical passages having a common opening (64) facing downwardly, whereby, said sleeve member (60) is able to be moved downwardly along said pair of elongated stands (16) of said handle portion (10) to a first position where said first bight and an upper portion of each of said pair of vertical legs (22) of said support member (20) are received within said recessed portion (64) of said sleeve member (60) with said first bight (21) of said support member (20) abutting against said top plate (65) of said sleeve member (60) such that each of said elongated stands (16) of said handle portion (10) is respectively fixed to a corresponding one of said vertical legs (22) of said support member (20), thereby fixing said handle portion (10) to said support member (20), and said sleeve member (60) is able to be moved upwardly along said pair of elongated stands (16) to a second position where said first bight (21) and said vertical legs (22) of said support member (20) are detached from said recessed portion (64) of said sleeve member (60) such that said elongated stands (16) of said handle portion (10) are able to pivot relative to said vertical legs (22) of said support member (20), thereby folding said handle portion (10).

2. The control device in accordance with claim 1, further comprising a pivot axle (30) fixed to the lower end of each of said vertical legs (22) of said support member (20), said base member (40) comprising a plurality of parallel elongated rods (41) each having a distal end pivotally engaged with said pivot axle (30), said control device further comprising an elongated bar (43) fixedly attached to the lower end of each of said vertical legs (22) of said support member (20) and located beneath said plurality of elongated rods (41), a snapping member (50) movably mounted on said base member (40) between adjacent two of said elongated rods (41) and having a hook end (53) formed on an underside thereof for releasable engagement with said elongated bar (43), whereby, when said hook end (53) of said snapping member (50) is engaged with said elongated bar (43), pivotal movement of said elongated rods (41) relative to said support member (20) about said pivot axle (30) is limited such that said base member (40) is fixed by means of said elongated bar (43), and when said hook end (53) of said snapping member (50) is detached from said elongated bar (43), said elongated rods (41) are able to pivot relative to said support member (20) about said pivot axle (30), thereby folding said base member (40).

3. The control device in accordance with claim 2, wherein said snapping member (50) comprises a pair of sleeves (51) each movably mounted around a corresponding one of adjacent two of said elongated rods (41) such that said snapping member (50) is slidable on said base member (40).

4. The control device in accordance with claim 2, wherein said base member (40) further comprises a bent support portion (42) formed on a distal end of each of said elongated rods (41).

5. The control device in accordance with claim 1, wherein said movable sleeve member (60) further comprises a handgrip (61) formed on an upperside of said top plate (65) thereof.

6. The control device in accordance with claim 1, further comprising a padded sleeve (12) securely mounted around said second bight (11) of said handle portion (10).

7. The control device in accordance with claim 1, wherein each of said elongated stands (16) of said handle portion (10) has a lower end pivotally engaged with an upper end of a corresponding one of said vertical legs (22) of said support member (20), a recess (13) is defined in the lower end of each of said elongated stands (16) for receiving said first bight (21) of said support member (20) therein such that said elongated stands (16) are able to align with said vertical legs (22) and such that said movable sleeve member (60) is able to receive said first bight (21) and said vertical legs (22) within said recessed portion (64) thereof, thereby fixing said elongated stands (16) of said handle portion (10) to said vertical legs (22) of said support member (20).

* * * * *